United States Patent [19]

Garland et al.

[11] 3,824,601

[45] July 16, 1974

[54] MULTI-COLOR MAGNETIC IMAGE RECORDING AND MEDIA

[75] Inventors: Thomas H. Garland, El Monte; Sherman W. Duck, Altadena; Frederick J. Jeffers, Altadena; Richard J. McClure, Altadena, all of Calif.

[73] Assignee: Bell & Howell Company, Chicago, Ill.

[22] Filed: Mar. 28, 1972

[21] Appl. No.: 238,899

[52] U.S. Cl. .................................. 346/74.1, 360/59
[51] Int. Cl. ....................... G01d 15/12, G01d 15/34
[58] Field of Search ......... 346/74 MP, 74 M, 74 ES, 346/74 MT, 74 P, 74 BB, 74.1; 340/174; 178/5, 4 CD

[56] References Cited

UNITED STATES PATENTS

| | | | |
|---|---|---|---|
| 3,094,429 | 6/1963 | Howell | 346/74 ES |
| 3,441,938 | 4/1969 | Markgraf | 346/74 ES |
| 3,472,695 | 10/1969 | Kaufer | 346/74 MP |
| 3,523,158 | 8/1970 | Zaphiropoulos | 346/74 ES |
| 3,526,704 | 9/1970 | Meller | 346/74 MP |

*Primary Examiner*—Bernard Konick
*Assistant Examiner*—Jay P. Lucas
*Attorney, Agent, or Firm*—Benoit Law Corporation

[57] ABSTRACT

A color print of an image is provided by producing of each color component to be printed a magnetic record that has its specific magnetic moment. Each of these magnetic records is printed out with a toner that corresponds in color to the particular color component and that is magnetically attractable by the particular magnetic moment.

31 Claims, 12 Drawing Figures

MULTI-COLOR MAGNETIC IMAGE RECORDING AND MEDIA

BACKGROUND OF THE INVENTION

1. Field of the Invention

The subject invention relates to information recording and, more particularly, to magnetic recording and imaging.

2. Description of the Prior Art

Information recording and imaging techniques which exploit magnetic phemonena are under continuous widespread investigation.

Prior-art magnetic color imaging methods provide separate color component images which were individually printed out on a sheet of paper or similar material. This led to registration problems that encumbered the printout process and impaired the image quality.

SUMMARY OF THE INVENTION

The subject invention overcomes this problem and from one aspect thereof provides a method of producing a color print of an image having first and second color components, comprising in combination the steps of providing a magnetic recording medium including alternating first and second portions for retaining magnetic records of said first and second color components, respectively, providing at said first portions a magnetic record of said first color component having a maximum first magnetic moment, providing at said second portions a magnetic record of said second color component having a maximum second magnetic moment lower than said first magnetic moment, providing a first toner corresponding in color to said first color component and being magnetically attractable by a magnetic moment of a minimum value between said first and second magnetic moment, providing a second toner corresponding in color to said second color component and being magnetically attractable by a magnetic moment of a minimum value at least as low as said second magnetic moment, establishing a toner image of said first color component through magnetic attraction of said first toner by the magnetic record of the first color component, establishing a toner image of said second color component through magnetic attraction of said second toner by the magnetic record of the second color component, and printing out said toner images of said first and second color components so as to provide a color print of said image.

From another aspect thereof, the subject invention resides in a method of producing a color print of an image having first, second and third color components, comprising in combination the steps of providing a magnetic recording medium including alternating first, second and third portions for retaining magnetic records of said first, second and third color components, respectively, providing at said first portions a magnetic record of said first color component having a maximum first magnetic moment providing at said second portions a magnetic record of said second color component having a maximum second magnetic moment lower than said first magnetic moment, providing at said third portions a magnetic record of said third color component having a maximum third magnetic moment lower than said second magnetic moment, providing a first toner corresponding in color to said first color component and being magnetically attractable by a magnetic moment of a minimum value between said first and second magnetic moments, providing a second toner corresponding in color to said second color component and being magnetically attractable by a magnetic moment of a minimum value between said second and third magnetic moment, providing a third toner corresponding in color to said third color component and being magnetically attractable by a magnetic moment of a minimum value at least as low as said third magnetic moment, establishing a toner image of said first color component through magnetic attraction of said first toner by the magnetic record of the first color component, establishing a toner image of said second color component through magnetic attraction of said second toner by the magnetic record of the second color component, establishing a toner image of said third color component through magnetic attraction of said third toner by the magnetic record of the third color component, and printing out said toner images of said first, second and third color components so as to provide a color print of said image.

From a further aspect thereof, the subject invention resides in apparatus for providing a color print of an image having first and second color components, comprising in combination a magnetic recording medium including alternating first and second portions for retaining magnetic records of said first and second color components, respectively, means operatively associated with said magnetic recording medium for providing at said first portions a magnetic record of said first color component having a maximum first magnetic moment, means operatively associated with said magnetic recording medium for providing at said second portions a magnetic record of said second color component having a maximum second magnetic moment lower than said first magnetic moment, means for providing a first toner corresponding in color to said first color component and being magnetically attractable by a magnetic moment of a minimum value between said first and second magnetic moments, means for providing a second toner corresponding in color to said second color component and being magnetically attactable by a magnetic moment of a minimum value at least as low as said second magnetic moment, means operatively associated with said supply of first toner for establishing a toner image of said first color component through magnetic attraction of said first toner by the magnetic record of the first color component, means operatively associated with said supply of second toner for establishing a toner image of said second color component through magnetic attraction of said second toner by the magnetic record of the second color component, and means operatively associated with said toner images for printing out said toner images of said first and second color components to provide a color print of said image.

From a further aspect thereof, the subject invention resides in apparatus for providing a color print of an image having first and second color components, comprising in combination a magnetic recording medium including alternating first and second portions for retaining magnetic records of said first and second color components, respectively, with said first portions including magnetic material magnetizable up to a first level of magnetization and said second portions including magnetic material magnetizable up to a second level of magnetization lower than said first level of magnetization, means operatively associated with said magnetic recording medium for providing at said first portions a magnetic record of said first color component having a maximum first magnetic moment correlated to said first level of magnetization, means operatively associated with said magnetic recording medium for providing at said second portions a magnetic record of said second color component having a maximum second magnetic moment correlated to said second level of magnetization and being lower than said first magnetic moment, means for providing a supply of a first toner corresponding in color to said first color component and being magnetically attractable by a magnetic moment of maximum value between said first and second magnetic moments, means for providing a supply of a second toner corresponding in color to said second color component and being magnetically attractable by a magnetic moment of a minimum value at least as low as said second magnetic moment, means operatively associated with said supply of first toner for establishing a toner image of said first color component through magnetic attraction of said first toner by the magnetic record of the first color component, means operatively associated with said supply of second toner for establishing a toner image of said second color component through magnetic attraction of said second toner by the magnetic record of the second color component, and means operatively associated with said toner images for printing out said toner images of said first and second color components so as to provide a color print of said image.

From a further aspect thereof, the subject invention resides in apparatus for providing a color print of an image having first, seoond and third components, comprising in combination a magnetic recording medium including alternating first, second and third portions for retaining magnetic records of said first, second and third color components, respectively, means operatively associated with said magnetic recording medium for providing at said first portions of magnetic record of said first color component having a maximum first magnetic moment, means operatively associated with said magnetic recording medium for providing at said second portions a magnetic record of said second color component having a maximum second magnetic moment lower than said first magnetic moment, means operatively associated with said magnetic recording medium for providing at said third portions a magnetic record of said second color component having a maximum third magnetic moment lower than said second magnetic moment, means for providing a supply of a first toner corresponding in color to said first color component and being magnetically attractable by a magnetic moment of a minimum value between said first and second magnetic moments, means for providing a supply of a second toner corresponding in color to said second color component and being magnetically attractable by a magnetic moment of a minimum value between said second and third magnetic moments, means for providing a supply of a third toner corresponding in color to said third color component and being magnetically attractable by a magnetic moment of a minimum value at least as low as said third magnetic moment, means operatively associated with said supply of first toner for establishing a toner image of said first color component through magnetic attraction of said first toner by the magnetic record of the first color component, means operatively associated with said supply of second toner for establishing a toner image of said second color component through magnetic attraction of said second toner by the magnetic record of the second color component, means operatively associated with said supply of third toner for establishing a toner image of said third color component through magnetic attraction of said third toner by the magnetic record of the third color component, and means operatively associated with said toner images of said first, second and third color components for printing out said toner images of said first, second and third color components to provide a color print of said image.

From a further aspect thereof, the subject invention resides in apparatus for providing a color print of an image having first, second and third color components, comprising in combination a magnetic recording medium including alternating first, second and third portions for retaining magnetic records of said first, second and third color components, respectively, with said first portion being provided with magnetic material magnetizable up to a first level of magnetization, said second portions being provided with magnetic material magnetizable up to a second level of magnetization lower than said first level, and said third portions being provided with magnetic material magnetizable up to a third level of magnetization lower than said second level, means operatively associated with said magnetic recording medium for providing at said first portions a magnetic record of said first color component having a maximum first magnetic moment correlated to said first level of magnetization, means operatively associated with said magnetic recording medium for providing at said second portions a magnetic record of said second color component having a maximum second magnetic moment correlated to said second level of magnetization and being lower than said first magnetic moment, means operatively associated with said magnetic recording medium for providing at said third portions a magnetic record of said third color component having a maximum third magnetic moment correlated to said third level of magnetization and being lower than said second magnetic moment, means providing a supply of a first toner corresponding in color to said first color component and being magnetically attractable by a magnetic moment of a minimum value between said first and second magnetic moments, means for providing a supply of a second toner corresponding in color to said second color component and being magnetically attractable by a magnetic moment of a minium value between said second and third magnetic moments, means for providing a supply of a third toner corresponding in color to said third color component and being magnetically attractable by a magnetic moment of a minimum value at least as low as said third magnetic moment, means operatively associated with said supply of first toner for establishing a toner image of said first color component through magnetic attraction of said first toner by the magnetic record of the first color component, means operatively associated with said supply of second toner for establishing a toner image of said second color component through magnetic attraction of said second toner by the magnetic record of the second color component, means operatively associated with said supply of third toner for establishing a toner image of said third color component through magnetic attraction of said third toner by the magnetic record of the third color component, and means operatively associated with said toner images of said first, second and third color components for printing out said toner images of said first, second and third color components to provide a color print of said image.

From a further aspect thereof, the subject invention resides in a composite magnetic recording medium for recording first and second color components of an image, comprising in combination an optical filter structure including alternating first and second portions for passing, respectively, said first and second color components, photoconductive means operatively associated with said filter structure for producing thermal images of said first and second color components, and a layer of a magnetic material operatively associated with said photoconductive means and selectively undergoing a change in magnetic states in response to said thermal images.

From a further aspect thereof, the subject invention resides in a composite magnetic recording medium for recording first, second and third color components of an image, comprising in combination an optical filter structure including alternating first, second and third portions for passing, respectively, said first, second and third color components, photoconductive means operatively associated with said filter structure for producing thermal images of said first, second and third color components, and a layer of magnetic material operatively associated with said photoconductive means and selectively undergoing a change in magnetic states in response to said thermal images.

The methods of the subject invention which result in magnetic records of images having first and second color components, as well as these magnetic records, have utility of themselves, since these resulting magnetic records may be stored, distributed or sold for subsequent printout by a user.

Accordingly, the subject invention also resides in a method of providing a magnetic record of an image having first and second color components, comprising in combination the steps of providing a magnetic recording medium including alternating first and second portions for retaining magnetic records of said first and second color components, respectively, providing at said first portions a magnetic record of said first color component having a maximum first magnetic moment, and providing at said second portions a magnetic record of said second color component having a maximum second magnetic moment lower than said first magnetic moment.

From another aspect thereof, the subject invention resides in a method of providing a magnetic record of an image having first, second and third color components, comprising in combination the steps of providing a magnetic recording medium including alternating first, second and third portions for retaining magnetic records of said first, second and third color components, respectively, providing at said first portions a magnetic record of said first color component having a maximum first magnetic moment, providing at said second portions a magnetic record of said second color component having a maximum second magnetic moment lower than said first magnetic moment, and providing at said third portions a magnetic record of said third color component having a maximum third magnetic moment lower than said second magnetic moment.

From yet another aspect thereof, the subject invention resides in a magnetic record of an image having first and second color components, comprising in combination a magnetic recording medium, a first magnetic record of said first color components, said first magnetic record being on said recording medium and having a maximum first magnetic moment, and a second magnetic record of said second color components, said second magnetic record being on said recording medium and having a maximum second magnetic moment lower than said first magnetic moment.

BRIEF DESCRIPTION OF THE DRAWINGS

The subject will become more readily apparent from the following detailed description of preferred embodiments thereof, illustrated by way of example in the accompanying drawings, in which.

PREFERRED EMBODIMENTS OF THE INVENTION

Figure 1:
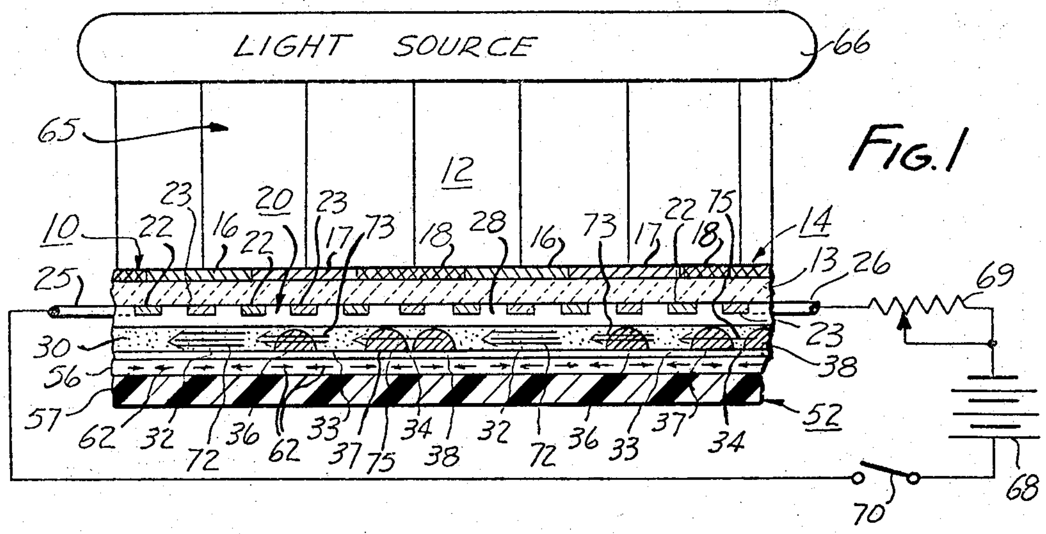
FIG. 1 is a cross-section through a composite recording medium in accordance with a first preferred embodiment of the subject invention, and a diagrammatic illustration of an apparatus and of a method in accordance with a second preferred embodiment of the subject invention.
Figure 2:
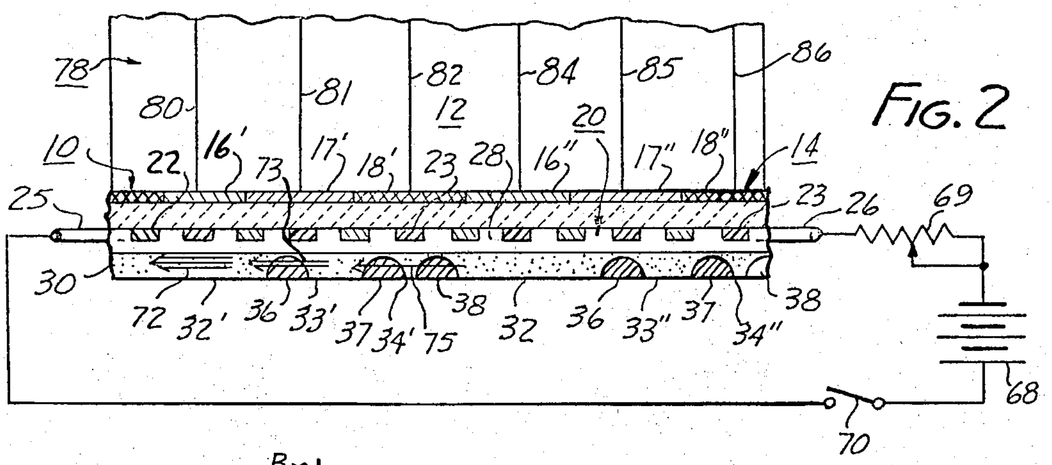
FIG. 2 illustrates an image-wise exposure of the recording medium of FIG. 1.

The composite recording medium 10 included in the color imaging apparatus 12 of FIGS. 1 and 2 has a substrate 13 which may be of glass or of an organic material, such as a transparent high-temperature polyimide or polybenzamidazole. A color filter structure 14 is located on the substrate 13 and includes alternating elemental first, second and third color filters 16, 17 and 18. The filters 16, 17 and 18 may for instance be primary-color filters. By way of example, and not by way of limitation, the reference numeral 16 may designate blue filter elements, the reference numeral 17 green filter elements, and the reference numeral 18 red filter elements.

A photocell structure 20 is located on the other side of the substrate 13 and includes a system of alternating and interdigitated electrodes 22 and 23. A bus bar 25, only part of which is visible in FIGS. 1 and 2, interconnects the even-numbered electrodes 22, while a bus bar 26, only part of its is visible, interconnects the odd-numbered electrodes 23. In a preferred embodiment, the electrodes 22 and 23 run in parallel to each other and in a direction into the paper.

The electrodes 22 and 23 are preferably deposited on the substrate 13. The deposition of electrode structures on a transparent substrate is a well-established art and does not as such form part of the subject invention. Suffice to say, therefore, that the electrode system may be deposited on the substrate 13 by evaporating, painting or sputtering, and that preferred electrode materials include gold, indium, chromium, and aluminium.

The photocell structure 20 further includes a photoconductive layer 28 which is deposited on the substrate 13 and the electrode system. Suitable photoconductive materials for the layer 28 include cadmium sulfide, cadmium selenide, alloys of cadmium sulfide or cadmium selenide, and sensitized zinc sulfide.

Suitable photocell structures 20 are disclosed in detail in U.S. Patent application Ser. No. 29,584, filed Apr. 17, 1970, by Sherman W. Duck now U.S. Pat. No. 3,717,460 and Frederick J. Jeffers, and U.S. Patent application Ser. No. 29,583, filed Apr. 17, 1970, by Richard J. McClure now U.S. Pat. No. 3,717,459. Both of these applications are assigned to the present assignee and are herewith incorporated by reference herein.

Figures 3, 4:
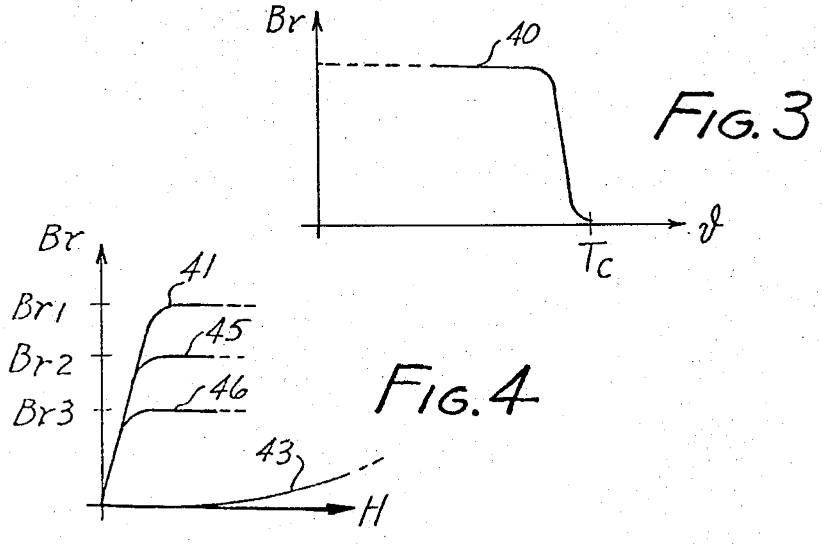
FIG. 3 is a magnetization plot illustrating a remanence magnetization characteristic of the recording medium of FIGS. 1 and 2.
FIG. 4 is a magnetization plot depicting the magnetization of individual portions of the recording medium of FIG. 1 and 2.

The composite recording medium 10 further includes a magnetic recording layer 30 which is located on and in heat transfer relationship with the photoconductive layer 28. Several materials and types of materials are suitable for the magnetic recording layer 30. Presently preferred materials include magnetic recording materials which change their magnetic state at a transition temperature. Examples of such materials include magnetic materials which undergo a physical change, such as a change in crystal structure, at a transition temperature. Manganese arsenide (MnAs) and manganese bismuthide (MnBi) belong to this group. Other examples include low-Curie point materials, notably ferromagnetic chromium dioxide ($CrO_2$). Other low-Curie point or low transition temperature materials are disclosed in the following United States Patents which are herewith incorporated by reference herein: No. 3,176,278, by L. J. Mayer, issued Mar. 30, 1965; No. 3,250,636, by R. A. Wilferth, issued May 10, 1966; No. 3,368,209, by McGlauchlin et al., issued Feb. 6, 1968; No. 3,364,496, by Greiner et al., issued Jan. 16, 1968; No. 3,472,695, by H. Kaufer et al., issued Oct. 14, 1969; No. 3,496,304, by A. M. Nelson, issued Feb. 17, 1970; No. 3,512,170, by A. M. Nelson, issued May 12, 1970; No. 3,555,556, by G. R. Nacci, issued Jan. 12, 1971; No. 3,613,102, by N. B. Daly et al., issued Oct. 12, 1971; and No. 3,626,114, by G. W. Lewicki et al., issued Dec. 7, 1971. Many of these materials have an acute magnetic state transition. Reference may also be had to U.S. Pat. No. 3,541,577, by J. U. Lemke, issued Nov. 17, 1970, which discloses the provision of acute magnetic state transitions, and which is herewith incorporated by reference herein. A preferred remanence magnetization curve 40 for the recording layer 30 is shown in FIG. 3, where $T_c$ designates the Curie point and $B_r$ designates the remanence magnetization upon heating and subsequent cooling of the recording layer.

As indicated in FIG. 2, the magnetic recording layer includes first, second and third portions 32, 33 and 34, which, respectively, correspond to the color filter elements 16, 17 and 18. While the portions 32, 33 and 34 may be compartmentalized or otherwise set off from each other, it should be noted that these portions may also form part of the same integral layer 30.

In accordance with a preferred embodiment of the subject invention a higher magnetization is imparted to the portions 32 than to the portions 33, and a higher magnetization is impoarted to the portions 33 than to the portions 34. This may, for instance, be accomplished by providing more magnetic material in the portions 32 than in the portions 33, and providing more magnetic material in the portions 33 than in the portions 34.

According to FIGS. 1 and 2, the amount of magnetic material in the portions 33 is reduced relative to the amount of magnetic material in the portions 32 by providing in each portion 33 a depression 36. Similarly, the amount of magnetic material in the portions 34 is reduced relative to the amount of magnetic material in the portions 33 by providing in each portion 34 a pair of depressions 37 and 38. By way of example, the depressions 36, 37 and 38 may be provided by a roller (not shown) which has corresponding protrusions and which is applied to the magnetic layer 30 while the same is still in an uncured state during the manufacture of the composite recording medium 10. If desired, the depressions 36, 37 and 38 may be filled with the same binder material as is employed for containing the magnetizable particles of the medium 30.

As is apparent from the curve 41 in FIG. 4, a thermoremanent magnetization resulting upon cooling of the magnetic material through the Curie point in the presence of a magnetic field is much stronger than a magnetization according to the curve 43 that typically would be obtained if the magnetic material were exposed to a magnetic field while remaining significantly below the Curie temperature.

The curve 41 in FIG. 4 shows a saturation magnetization $B_{r1}$ which is obtained with the amount of magnetic material present in the portions 32. A curve 45 in FIG. 4 displays a saturation magnetization $B_{r2}$ which is obtained with the lesser amount of magnetic material present in the portions 33. Similary, a curve 46 in FIG. 4 shows a saturation magnetization $B_{r3}$ which prevails with the still lesser amount of material present in the portions 34 of the magnetic recording layer 30.

Figure 9:
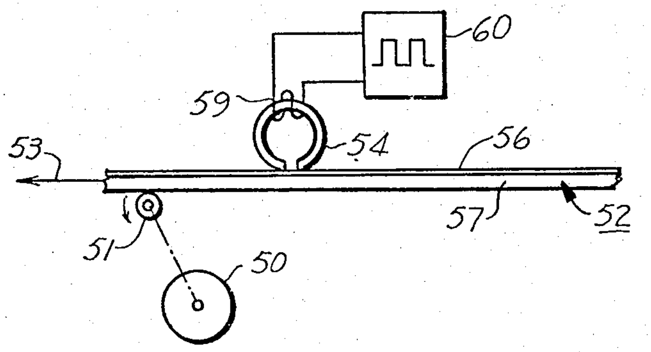
FIG. 9 is a schematic illustration of a method and apparatus for providing magnetic fields for the premagnetization of the recording medium of FIGS. 1 and 2 or FIGS. 5 and 6.

To obtain the magnetization indicated in FIG. 4, it is necessary to provide magnetic fields to which the recording layer 30 is exposed during its cooling through the Curie temperature region. A method and apparatus for providing the requisite magnetic fields are illustrated in FIG. 9, in which a drive 50 operating on a capstan 51 moves a premagnetization sheet 52 in the direction of an arrow 53 past a magnetic recording head 54. As its name implies, the premagnetization sheet 52 serves the premagnetization of the magnetizable material in the layer 30 of the composite recording medium 10. To this end, the sheet 52 has a layer 56 of ferromagnetic material deposited on a substrate 57. The same material may be used in the layer 56 as is employed in commercially available magnetic recording tapes. Accordingly, by way of example, the magnetic material in the layer 56 may be gamma ferric oxide or another iron oxide conventionally employed in magnetic recording tapes. If the temperature at which the composite recording medium 10 is operated does not substantially exceed 80°C, a ferromagnetic chromium dioxide may, for instance, be employed in the layer 56.

The magnetic recording head 54 has a winding 59 energized from a source of pulsating electric current 60, so as to provide in the layer 56 a uniformly distributed pattern of magnetic gradients 62 (see FIG. 1). In principle, the magnetization of the layer 56 may be continuous rather than in the form of spaced gradients. However, premagnetization in the form of a pattern of spaced gradients is generally preferred for improved gray-scale rendition and increased attraction of magnetic toner. The magnetic recording head 54 may typically extend out the width of the sheet 52, in which case the pattern indicated by the gradients 52 is composed of parallel magnetized lines. Where this gives rise to a moire pattern in, or other degradation of, the printed-out image, the recording head 54 may be broken down into several elemental heads distributed over the width of the sheet 52 and providing a pattern of dotlike magnetic gradients, rather than magnetized lines.

To effect the requisite premagnetization, the sheet 52 is positioned adjacent to the magnetic recording medium 10 as shown in FIG. 1, and the magnetic gradients are copies in the magnetic recording medium 30. This may be effected with the aid of one of the techniques disclosed in U.S. Pat. 2,738,383, Method and Apparatus for Duplicating Magnetic Recordings and Magnetic Tape Record Members, by R. Herr et al., issued Mar. 31, 1956, and herewith incorporated by reference herein. Those techniques employ an idealizing field, such as an anhysteretically alternating and declining magnetic field, for providing in a copy medium (here the medium 30) magnetic gradients that correspond to magnetic gradients (here the gradients 62) in a master medium (here the layer 56).

Alternatively and preferably, the medium 30 is premagnetized by means of a thermoremanent magnetization technique in which the magnetizable material in the layer 30 is cooled through its Curie temperature in the preence of the magnetic gradients 62. To this end, the composite medium 10 is exposed to light 65 from a light source 66. The light source 66 preferably includes a high-temperature tungsten-filament or other lamp that emits white light. During this and subsequent exposure steps, a special technique disclosed in the above mentioned copending Duck et al and McClure patent applications may be employed. According to that technique, instantaneous electric current requirements are sharply reduced by effecting the exposure successively within a narrow exposure band that extends orthogonally to the electrodes 22 and 23 and that advances in a direction parallel to these electrodes.

Color components in the white light 65 penetrate the color filter elements 16, 17 and 18 and the transparent substrate 13 to render the photoconductive layer 28 electrically conductive. To provide for the flow of electric currents, the electrodes 25 and 26 are connected to a source of electric current 68 through a variable resistor 69 and a normally closed switch 70.

The variable resistor 69 is so adjusted that the magnetizable medium layer 30 is heated to a temperature above the Curie temperature $T_c$ in response to a closure of the switch 70 and an exposure to the light 65. The switch 70 is thereupon opened and the exposure to the light 65 is terminated so that the magnetizable medium layer 30 cools by heat dissipation through its Curie temperature region, whereby the medium portions 32, 33 and 34 will be magnetized by thermoremanent magnetization by the gradients 62.

The resulting magnetization of the medium protions 32 is indicated by the curve 41 in FIG. 4 and by triple-shaft arrows 72 in FIGS. 1 and 2. The magnetization of the medium portions 33 is indicated by the curve 45 and double shaft arrows 73 in FIGS. 1 and 2. The magnetization of the medium portions 34 is indicated by the curve 46 and the single-shaft arrows 75. The different arrow configurations have been chosen to emphasize the fact that the premagnetization is strongest in the medium portions 32, average in the medium portions 33 and weakest in the medium portions 34, in accordance with the different amounts of magnetized material contained in those portions.

The composite recording medium 10 having been premagnetized in the desired manner, an exposure thereof to a color image 78 may now take place. By way of example, the color image 78 symbolically shown in FIG. 2 may be a full-color reflection of an object or of a picture, illustration or the like.

As shown in FIG. 2, the switch 70 is closed while the exposure to the color image 78 takes place. To facilitate the discussion of occurrences during such exposure, certain reference numerals in FIG. 2 have been provided with prime and double-prime symbols. More specifically, the filter element 16, 17 and 18 have, respectively, been designated in FIG. 2 as 16′ and 16″, 17′ and 17″, and 18′ and 18″, while the magnetized medium portions 32, 33 and 34 have, respectively, been designated in FIG. 2 as 32′ and 32″, 33′ and 33″ and 34′ and 34″. The filter elements 16′ and 16″ are blue color filters, the filter 17′ and 17″ are green color filters, and the filter elements 18′ and 18″ are red color filters.

Considering now the operation of the magnetic image recording process, it is assumed that the color image 78 has a component 80 that includes no blue light and that impinges on the filter element 16′, and a component 81 that includes no green light and that impinges on the filter element 17′, as well as a component 82 which includes no red light and which impinges on the filter element 18′. Since none of these components includes light that would be passed by the particular filter element, the portion of the photoconductor layer 28 below the filter elements 16′, 17′ and 18′ remains dark and thus electrically insulating. In consequence, no electric current can flow, and no heating takes place at the elemental portions 32′, 33′ and 34′ of the medium 30. Accordingly, the magnetization 72, 73 and 75 at these elemental medium portions remain intact.

In considering FIG. 2 it is further assumed that the input image 78 includes a strong blue component 84 that impinges upon the blue filter element 16″, and a strong green component 85 which impinges on the green filter element 17'', and a strong red component 86 which impinges on the red filter element 18''. The high-intensity blue light which penetrates the filter elements 16'' leads to a strong electric current in the photoconductive 28 which causes a heating of the elemental medium portion 32''. The same type of heating occurs at the elemental medium portions 33'' and 34'' in response to the color stimuli 85 and 86, respectively. The variable resistor 68 is so adjusted that the heating of the elemental portions 32'', 33'' and 34'' raises the temperature of these portions to a point in the close vicinity of, or slightly above, the Curie temperature $T_c$ when the components 84, 85 and 86 possess or exceed the highest intensity that is to be recorded. This above-Curie point heating causes the elemental portions 32'', 33'' and 34'' to be demagnetized.

In consequence, no magnetic toner will upon printout be attracted to the portions 32'', 33'' and 34'', and a white or transparent printout medium employed in preparing a color print of the input image 78 will remain white at the location of the elemental portions 32'', 33'' and 34''. At this juncture it may be helpful to consider that each triplet of color filter elements 16, 17 and 18 is made small enough to correspond in size to the cross-section of an elemental portion of the image 78 that is to be recorded to achieve a desired resolution. Accordingly, the components 84, 85 and 86 may be considered as part of a white elemental component of the input image 78. Since the component in question is white, it comprises the blue, green and red color components 84, 85 and 86, so that the above mentioned white appearance of the printout medium correctly represents the appearance of the input stimulus at the elemental filters 16'', 17'' and 18''.

If this principle is applied to the filter elements 16', 17' and 18', it will be realized that an input stimulus received at this filer element triplet which has no blue component, no green component and no red component is, in effect, of black appearance. If magnetic color toners are applied to the elemental portions 32', 33' and 34' in the manner discussed below, then the printout will be black and will thus correspond to the particular input stimulus since the three color toners will be individually attracted by the magnetic gradients 72, 73 and 75 to present in combination an image element of black appearance to the observer.

It will now be realized that FIG. 2 illustrates two extreme cases. As will be recognized in analogy to color printing, variations within these extremes are obtainable from different combinations of the three primary colors. Specific examples of multicolor recording and printout are given below.

Figure 5:
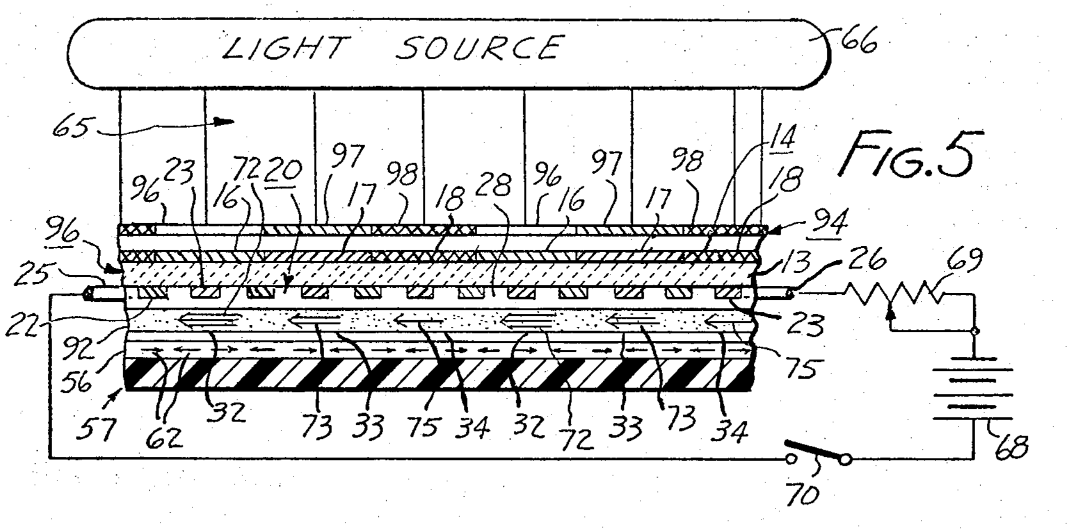
FIG. 5 is a cross-section through a composite recording medium in accordance with a third preferred ambodiment of the subject invention, and an illustration of an apparatus and a method in accordance with a first preferred embodiment of the subject invention.
Figure 6:
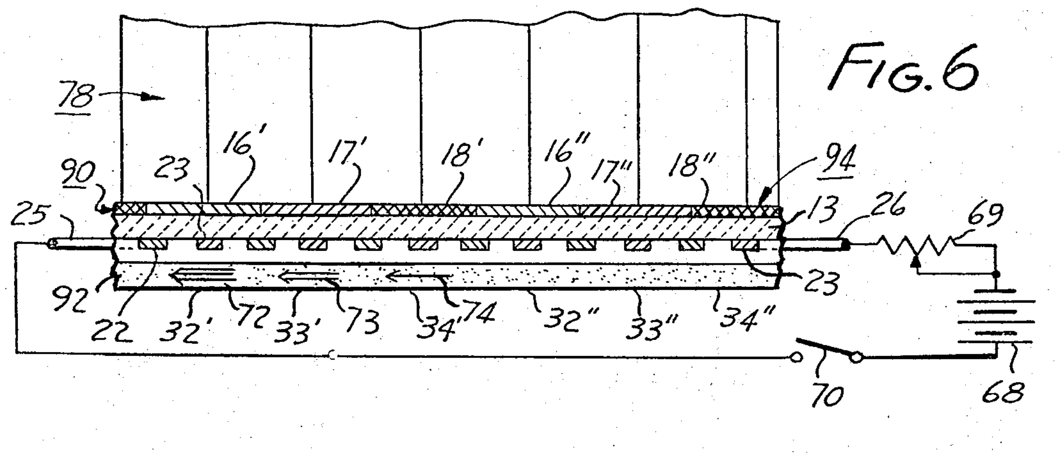
FIG. 6 depicts an image-wise exposure of the recording medium of FIG. 5.

FIGS. 5 and 6 illustrate a composite recording medium 90 in accordance with a further preferred embodiment of the subject invention, as well as a recording method and apparatus in accordance with yet another preferred embodiment of the subject invention. Like reference numerals among the FIGS. 1, 2, 5 and 6 designate like or functionally equivalent parts.

The composite recording medium 90 of FIGS. 5 and 6 corresponds in structure and composition to the composite recording medium 10 of FIGS. 1 and 2, except for the lack of the depressions 36, 37 and 38 shown in the latter two figures. In other words, the magnetic recording layer 92 in the composite medium 90 may include the same magnetizable material as the layer 30 in the composite medium 10, except that no depressions of the type shown in FIGS. 1 and 2 at 36, 37 and 38 are provided in the layer 92 of FIGS. 5 and 6.

According to FIG. 5, a second filter structure 94 is interposed between the composite recording medium 90 and the light source 66 when the above mentioned exposure to white light 65 takes place. The filter structure 94 includes elemental areas 96 of high transparency, elemental areas 97 of a transparency lower than the element areas 96, and elemental areas 98 of a transparency yet lower than that of the elemental areas 97. By way of example, the filter structure 94 may include elemental areas of varying gray scale.

In the embodiment illustrated in FIG. 5, the elemental areas 96, 97 and 98 of the filter structure 94 are aligned, respectively, with the color filter elements 16, 17 and 18 of the color filter structure 14. Accordingly, the portion of the white light 65 which reaches the filter elements 16 is of higher intensity than the portion which reaches the filter elements 17, while the portion of the white light that reaches the latter filter elements is of yet higher intensity than the portion that reaches the filter elements 18. As far as the photoconductive layer 28 is concerned, a higher light intensity means a higher intensity of electric current flowing between interdigitated electrodes 22 and 23. From the point of view of the magnetizable recording layer 92, an electric current of more intensity means a heating to a higher temperature.

Figure 7:
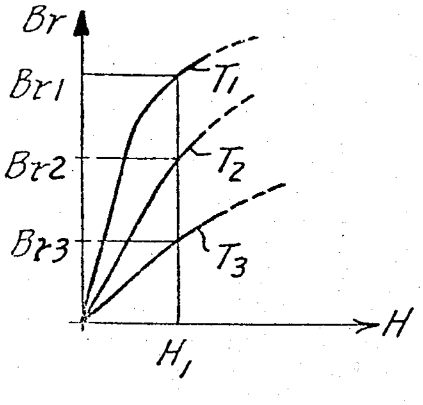
FIG. 7 is a magnetization plot illustrating the magnetization of different portions of the recording medium of FIG. 5.

Accordingly, the medium portions 32 will be heated to a higher temperature than the medium portions 33, while these elemental portions 33 will be heated to a higher temperature than the elemental portions 34 when the composite medum 90 is exposed to the white light 65 in the manner illustrated in FIG. 5. In this connection FIG. 7 illustrates the well-known fact that the degree of thermoremanent magnetization may be dependent on the temperature from which the particular material was cooled during the thermoremanent magnetization step. For instance, a strong thermoremanent magnetization of $B_{r1}$ results if the magnetizable medium 92 is cooled from a temperature of $T_1$ at or above the Curie point in the presence of a magnetic field $H_1$ provided by the magnetic gradients 62. A weaker remanent magnetization $B_{r2}$ results if the medium 92 is cooled in the presence of the magnetic field $H_1$ only from a temperature $T_2$ somewhat below the Curie point. A yet weaker remanent magnetization $B_{r3}$ results if the medium 92 is cooled in the presence of the field $H_1$ only from a temperature $T_3$ below $T_2$.

The relative degrees of transparency or gray-scale value of the filter areas 96, 97 and 98, and the adjustment of the variable resistor 69 are so chosen that the elemental portions 32 are heated to the temperature $T_1$, the elemental portions 33 to the temperature $T_2$ and the elemental portions 34 to the temperature $T_3$ during the white-light exposure step shown in FIG. 5. The switch 70, which is closed during this heating step, is thereupon opened so that the portions 32, 33 and 34 can cool by heat dissipation. Since such cooling takes place in the presence of the magnetic field provided by the gradients 62, the thermo-remanent magnetization illustrated in FIG. 7 takes place. As before, the elemental portions 32 are magnetized stronger than the portions 33, while the elemental portions 33 are magnetized stronger than the elemental portions 34. This is again illustrated by the arrows 72, 73 and 75.

The premagnetized composite recording medium 90 may now be exposed to a color image 78 in the same manner as has been discussed above for the composite recording medium 10 in connection with FIG. 2. As illustrated in FIG. 6, the exposure of the composite recording medium 90 in the above mentioned manner results in a retention of the premagnetizations of the elemental portions 32', 33' and 34', while the elemental portions 32'', 33'' and 34'' are demagnetized. While FIG. 6 represents an extreme case, specific examples of multicolor recording and printout are given below.

From the point of view of practical application, the embodiment of FIGS. 5 and 6 is presently preferred over the embodiment of FIGS. 1 and 2 since the embodiment of FIGS. 5 and 6 does not require a provision of different material quantities in the elemental portions 32, 33 and 34, does not rely on saturation magnetization effects.

Figure 8:
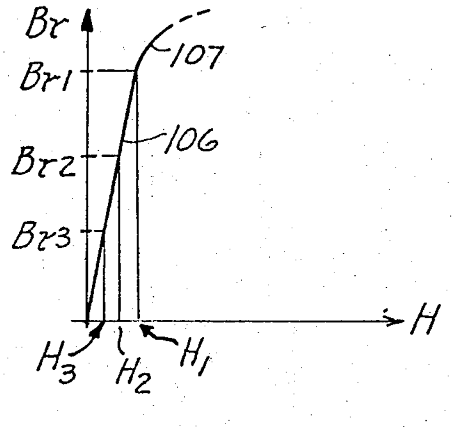
FIG. 8 is a magnetization plot illustrating an alternative mode of magnetization of different portions of the recording medium of FIGS. 5 and 6.
Figures 10, 11, 12:
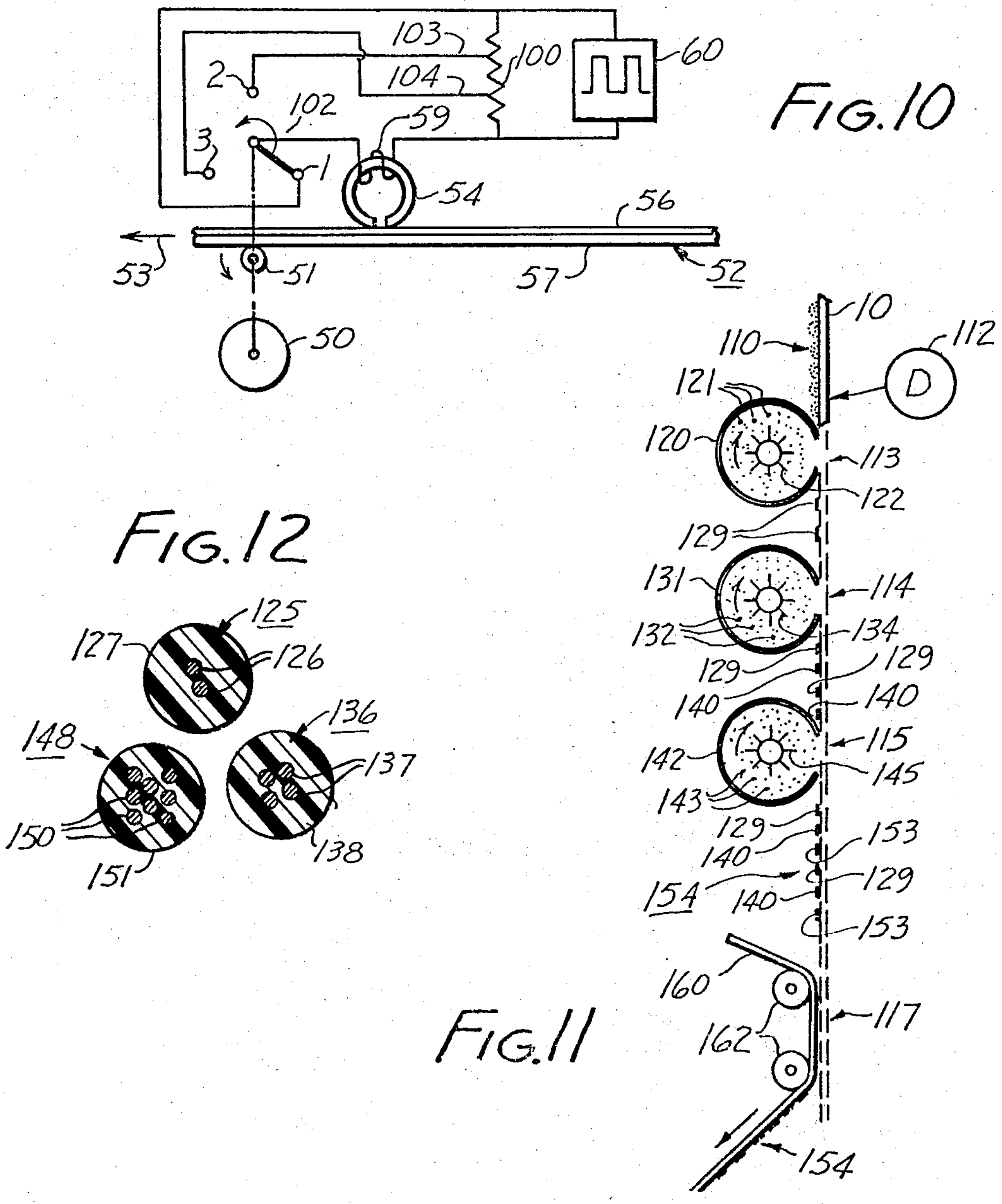
FIG. 10 is a schematic illustration of a method and apparatus for providing magnetic fields for the premagnetization of the recording medium of FIGS. 5 and 6.
FIG. 11 is a diagrammatic illustration of a color image printout method and apparatus in accordance with yet another preferred embodiment of the subject invention.
FIG. 12 is a section through particles of color toners in accordance with a further embodiment of the subject invention.

A modification of the embodiment of FIGS. 5 and 6 is illustrated in FIGS. 8 and 10; with like reference numerals among FIGS. 7, 8, 9 and 10 designated like or functionally equivalent parts or parameters.

According to FIG. 10, a potentiometer 100 is connected across the pulsed current source 60. A synchronous switch or distributor 102 has a contact 1 connected to one end of the potentiometer 100, and a contact 2 connected to a tap 103 of the potentiometer 100. Similarly, a contact 3 of the switch 102 is connected to a tap 104 of the potentiometer 100. The winding 59 of the recording head 54 is connected between the sliding arm of the switch 102 and another end of the potentiometer 100 so that the winding 59 is energized at substantially the full potential of the source 60 when the sliding switch arm is in connection with contact 1. When the switch arm is in connection with the contact 2, the winding 59 is energized from the source 60 at a reduced current and potential, and when the switch arm is in connection with the contact 3, the winding 54 is energized by a yet lower current and lower potential. The switch 102 is coupled to and driven in synchronism with the capstan 51 so that different elemental portions of the premagnetization sheet 52 are magnetized at different levels. By way of example, the magnetic gradients 62 that are located in portions of the layer 56 that correspond to the elemental portions 32 may be made in the manner illustrated in in FIG. 10 to have a stronger intensity than those magnetic gradients 62 that are located at the elemental portions 33. Similarly, the magnetic gradients that are located at the medium portions 33 may be made to have a stronger intensity then those magnetic gradients 62 that are located at the elemental portions 34 of the magnetizable layer 92 shown in FIG. 5.

The purpose of such a magnetic gradient intensity variation is apparent from FIG. 8 which illustrates the well-known fact that the thermoremanent magnetization of a material is, within a certain linear region 106 of the thermoremanent magnetization curve 107, a function of the strength of the magnetic field that is present during the cooling step. The strength of the magnetic field that results in the elemental portions 32 after the premagnetization sheet 52 produced in accordance with FIG. 10 is placed adjacent to the composite recording medium 90 may be designated by $H_1$. The strength of the magnetic field provided by gradients 62 at the elemental portions 33 is designated by $H_2$, and the strength of the magnetic field provided by the gradients 62 at the elemental portions 34 of the layer 92 is designated by the symbol $H_3$.

Preparatory to the requisite cooling, the composite medium 90 is exposed to the white light 65 as shown in FIG. 5 except that the grey filter structure 94 is removed. In other words, no gray-filter structure 94 is employed if the premagnetization sheet 52 has been provided in the manner illustrated in FIG. 10 with magnetic gradients of different intensity at different elemental portions of the layer 56. During the exposure to the white light 65, the switch 70 is closed and the variable resistor 69 is adjusted so that the elemental portions 32, 33 and 34 are heated to a temperature of $T_1$ which is at or somewhat above the Curie point of the recording layer 92. Since the gray-scale filter structure 94 is not employed in the embodiment under discussion, the elemental portions 32, 33 and 34 are heated to substantially the same temperature, assuming a sufficiently white composition of the light 65. The switch 70 is thereupon opened so that the elemental portions 32, 33 and 34 cool through the Curie point region of the magnetization layer 92. As indicated in FIG. 8, the elemental portions 32 are thereby subjected to a remanent magnetization $B_{r1}$ of high intensity. A remanent magnetization $B_{r2}$ of lower intensity is effected in the elemental portions 33, while a remanent magnetization $B_{r3}$ of yet lower intensity is provied in the elemental portions 34. This corresponds to the relative premagnetizations indicated in FIG. 5 by the arrows 72, 73 and 75.

The requisite differential premagnetizations having been provided, the medium 90 may now again be exposed in the manner illustrated in FIG. 6 and described above in connection with that figure, to provide a magnetic record of the various color components of the input image 78.

To facilitate an understanding of the subject invention, some illustrative examples of color recording and printout will now be given. As indicated above, a situation in which all magnetic moments 72, 73 and 75 in a triplet region (such as 32'', 33'', and 34'') are turned off represents the extreme case of recording a white or transparent region of the input image. Similarly, a situation in which all magnetic moments 72, 73 and 75 in a triplet region (such as 32', 33' and 34') remain turned on represents the other extreme case of recording a black region of the input image, where all three color toners are attracted to print out a black spot or spots.

Using the expression "turned off" as a term of convenience designated an erasure of a magnetic moment, effected typically by above-Curie point heating, and using "turned on" as a term of convenience designated cases in which magnetic moments persist because of a lack of heating to or above the Curie point, we may contemplate some recording situations occurring between the extremes shown in the drawings.

For instance, a red input image stimulus hitting the filter triplet 16', 17', and 18' will only be able to turn off the magnetic moment 75, while the magnetic moments 72 and 73 remain turned on. As will become apparent upon a consideration of FIGS. 11 and 12 and a study of their description set forth below, the magnetic moments 72 attract yellow toner, and the magnetic moments 73 attract magenta toner. A terms of the example under discussion, this means that the red input image stimulus will be printed out red, since the attracted yellow and magenta toner piles jointly form a red color impression.

By way of further example, let us now assume that the input image has a yellow component that hits the filter triplet 16'', 17'', and 18''. Since components of yellow light are passed by the green and red filter elements 17'' and 18'' the magnetic moments 73 and 75 are turned off. The remaining magnetic moment will attract yellow toner, so that the yellow input stimulus is correctly printed out.

Similarly, if, say, the triplet 16', 17', and 18' is hit by a cyan color stimulus, the magnetic moments 72 and 73 are turned off, since the blue and green filter elements 16' and 17' pass components of the cyan input stimulus. As a result, there remains the magnetic moment 75 which, as mentioned below, will attract cyan toner for a correct , printout of the cyan input stimulus.

Other primary or mixed color recordings and printouts proceed mutatis mutandis in a similar fashion. In practice, the recording medium 10 or 90 is preferably so constructed that each color region to be recorded covers several color filter triplets 16, 17 and 18, whereby color degradation effects that might otherwise occur from the simultaneous presence at border regions of toner piles belonging to different color regions are minimized.

By way of further example, the recording media and processes of the subject invention are also suitable for the production of positive prints from photographic or other color negatives. To this end, yellow magenta and cyan filter elements are substituted in the filter structure 14 for the blue, green and red filter elements 16, 17 and 18, respectively.

A preferred method and apparatus according to the subject invention for printing out the magnetic records produced in accordance with FIGS. 1 and 2 or FIGS. 5 and 6 is illustrated in FIG. 11. For the sake of simplicity FIG. 11 is described in terms of a toning of magnetic records appearing on the composite medium 10. It should, however, be understood that the method and apparatus of FIG. 11 are equally applicable to a toning of magnetic records appearing on the composite medium 90.

According to FIG. 11, the composite medium 10 bearing a magnetic record 110 of the color image 78 is moved by a conveyor, symbolically illustrated 112, through a number of toning stations 113, 114 and 115 and through a printout station 117. The toning station 113 includes a toning apparatus 120 in which color toner 121 is brought into the proximity of the magnetic record 110 by an agitator 122 or a similar device. While FIG. 11 shows the toning apparatus 120 somewhat schematically, it should be noted that suitable toning equiment is more fully disclosed in U.S. Pat. No. 2,932,278, by J. C. Sims, issued Apr. 12, 1960, U.S. Pat. No. 2,943,908, by J. P. Hanna, issued July 5, 1960, U.S. Pat. No. 3,250,636, by R. A. Wilferth, issued May 10, 1966, and U.S. Pat. application Ser. No. 850,958, filed Aug. 18, 1969, (now U.S. Pat. No. 3,601,091) by George G. Preckshot, and assigned to the subject assignee. Toning equipment of this type may also be provided at the toning stations 114 and 115.

The toner 121 comprises a multitude of toner particles one of which is illustrated at 125 in FIG. 12. The toner particle 125 has a number of magnetically attractable particles 126 contained in a shell 127 that includes a pigment or dye of the color with which the magnetic record located at the elemental portions 32 and illustrated by the arrows 72 (see FIG. 6) is to be toned. Since the elemental filters 16 pass blue light, the shells 127 are preferably colored yellow. The size and number of the magnetically attractable particles 126 and the size of the shell 127 of each toner particle 125 are such that the toner 121 is magnetically attracted by a magnetic moment having a minimum value between the magnetic moment represented by the arrows 72 and the lesser magnetic moment represented by the arrows 73 (see FIG. 2). In other words, the toner 121 is attracted by magnetic moments of the type illustrated by the arrow 72, but not by the weaker magnetic moments illustrated by the arrows 73 and 75. In this manner, the toner 121 is only attracted to the elemental portions 32 of the magnetic layer 30, so that the resulting toner image 129 corresponds (i.e. is complementary) to the luminous input intelligence passed by the filter elements 16.

The toning station 114 includes a toning apparatus 131 in which a magnetically attractable toner 132 is moved into proximity to the magnetic record 110 by means of an agitator 134 or other device. The toner 132 comprises a multitude of toner particles one of which is illustrated at 136 in FIG. 12.

The toner particle 136 includes a number of magnetically attractable particles 137 contained in a shell 138. In the illustrated preferred embodiment, a pigment or dye provides the shell 138 with a color that corresponds to the color of the luminous intelligence passed by the elemental filters 17. Since the color of this luminous intelligence is green as mentioned above, the shells 138 of the toner 132 are magenta colored. The size and number of the magnetically attractable particles 137 and the size and the shells 138 are such that the toner 132 is attracted by magnetic moments of a minimum value between the magnetic moment symbolized by the arrow 73 and the weaker magnetic moment symbolized by the arrow 75 (see FIG. 2). In other words, a magnetic moment which is as weak as the magnetic moment symbolized by the arrow 75 is not able to attract the toner 132. The magnetic moments symbolized by the arrows 72 and 73 are, however, strong enough to attract the toner 132. However, since the toner image 129 which covers magnetized elemental portions 32 contains a multitude of magnetic particles 126 that conduct and contain the magnetic fields illustrated by the arrows 72, only the magnetic fields symbolized by the arrows 73 are available for the attraction of the toner 132. Accordingly, the toner 132 provides a toner image 140 which extends over magnetized elemental portions 33 and which corresponds (i.e. is complementary) in color to the luminous intelligence passed by elemental filters 17.

The toner station 115 includes a toning apparatus 142 in which toner 143 is brought into proximity of the magnetic record 110 by means of an agitator 145 or similar device. The toner 143 comprises a multitude of particles of the kind shown at 148 in FIG. 12. Substantially each toner particle 148 has a number of magnetically attractable particles 150 contained in a shell 151. The shells 151 are colored cyan since the filter elements 18 are red color filters.

The size and number of the magnetically attractable particles 150 and the size of the shell 151 are such that the toner 143 is attracted by a magnetic moment of a minimum value at least as low as, if not lower than, the magnetic moment symbolized by the arrow 75 (see FIG. 2). This, in principle, renders the toner 143 subject to attraction by the magnetic moments symbolized by the arrows 72, 73 and 75. However, since the toner image 129 includes magnetic particles 126 which conduct and contain magnetic fields emanating from magnetized elemental portions 32, and since the toner image 140 includes magnetic particles 137 which conduct and contain magnetic fields emanating from magnetized elemental portions 33, only the magnetic fields provided by magnetized elemental portions 34 remain capable of attracting the toner 143. Accordingly, the toner 143 is attracted to magnetized elemental portions 34 to provide a toner image that corresponds (i.e. is complementary) in color to luminous intelligence passed by elemental filters 18. In this manner, a composite toner image 154 of the color input image 78 is provided on the recording medium 10 by operation of the color printout principles discussed above.

It may be helpful at this juncture to consider a series of statements herein employed according to which a first toner corresponds in color to a first color component, a second toner corresponds in color to a second color component, and a third toner corresponds in color to a third color component of the input image 78. If these first, second and third color components are the blue, green and red components passed, respectively, by the filter elements 16, 17 and 18, then the first, second and third toners may, respectively, be colored yellow, magenta and cyan, as described above in connection with the illustrated preferred embodiments. In this case the expression "corresponding" in the statement under consideration does not narrowly refer to exact identity, but rather to a mutual relation of a type sometimes expressed by the word "correlated," and sometimes also by the word "corresponding."

Reverting to FIG. 11, it will be noted that the composite toner image 154 is printed out from the recording medium 10 onto a printout medium 160 which may comprise a web of paper, film or foil which preferably provides a white background for the toner image 154 or which is light-transparent. A pair of rollers 162 symbolizes means for moving the printout paper 160 into proximity to the recording medium 10 for a transfer of the toner image 154 to the printout medium 160. In accordance with conventional practice, the printout medium 160 may have an adhesive coating (not shown) for receiving the composite toner image 154 and removing the same from the recording medium 10. On the other hand, the toner shells 127, 138 and 151 (see FIG. 12) may include thermoplastic or other fusible material for a thermal fusion of the toner image 154 to the printout medium 160 in the manner described, for instance, in U.S. Pat. No. 3,250,636 by R. A. Wilferth, issued May 10, 1966, or in U.S. Pat. No. 3,052,564, by F. W. Kulesza, issued Sept. 4, 1962.

We claim:

1. A method of providing a color print of an image having first and second color components, comprising in combination the steps of:

providing a magnetic recording medium including alternating first and second portions for retaining magnetic records of said first and second color components, respectively;

providing at said first portions a magnetic record of said first color component having a maximum first magnetic moment;

providing at said second portions a magnetic record of said second color component having a maximum second magnetic moment lower than said first magnetic moment;

providing a first toner corresponding in color to said first color component and being magnetically attractable by a magnetic moment of a minimum value between said first and second magnetic moment;

providing a second toner corresponding in color to said second color component and being magnetically attractable by a magnetic moment of a minimum value at least as low as said second magnetic moment;

establishing a toner image of said first color component through magnetic attraction of said first toner by the magnetic record of the first color component;

establishing a toner image of said second color component through magnetic attraction of said second toner by the magnetic record of the second color component; and printing out said toner images of said first and second color components so as to provide a color print of said image.

2. A method as claimed in claim 1, wherein:

said magnetic record of the first color component is provided by imparting to said first portions a first premagnetization having said first magnetic moment, and by selectively reducing said first magnetic moment in response to the first color component; and said magnetic record of the second color component is provided by imparting to said second portions a second premagnetization having said second magnetic moment, and by selectively reducing said second magnetic moment in response to the second color component.

3. A method as claimed in claim 2, wherein:

said first and second premagnetizations are imparted to said first and second portions, respectively, by providing first magnetic fields having a first predetermined intensity and second magnetic fields having a second predetermined intensity lower than said first intensity, and by magnetizing said first portions with the aid of said first magnetic fields and said second portions with the aid of said second magnetic fields.

4. A method as claimed in claim 2, wherein:

said first and second premagnetizations are imparted to said first and second portions, respectively, by providing first magnetic fields having a first predetermined intensity and second magnetic fields having a second predetermined intensity lower than said first intensity, exposing said first portions to said first magnetic fields and said second portions to said second magnetic fields, and thermoremanently magnetizing said first portions with the aid of said first magnetic fields and said second portions with the aid of said second magnetic fields.

5. A method as claimed in claim 2, wherein:

said first and second premagnetizations are imparted to said first and second portions, respectively, by providing magnetic fields, exposing said first and second portions to said magnetic fields, magnetizing said first portions with the aid of said magnetic fields and first transfer stimuli, and magnetizing said second portions with the aid of said magnetic fields and second transfer stimuli having lower intensities than said first transfer stimuli.

6. A method as claimed in claim 2, wherein:

said first and second premagnetizations are imparted to said first and second portions, respectively, by providing magnetic fields, exposing said first and second portions to said magnetic fields, thermoremanently magnetizing said first portions with the aid of said magnetic fields and first thermal stimuli, and thermoremanently magnetizing said second portions with the aid of said magnetic fields and second thermal stimuli having lower intensities than said first thermal stimuli.

7. A method as claimed in claim 1, wherein:

said first portions are provided with magnetic material magnetizable up to a first level of magnetization correlated to said first magnetic moment;

said second portions are provided with magnetic material magnetizable up to a second level of magnetization correlated to said second magnetic moment;

said magnetic record of the first color component is provided by premagnetizing said first portions to said first level, and by selectively reducing the premagnetization of the first portions in response to the first color component; and said magnetic record of the second color component is provided by premagnetizing said second portions to said second level, and by selectively reducing the premagnetization of the second portions in response to the second color component.

8. A method as claimed in claim 7, wherein:

said first portions are provided with more of said magnetic material than said second portions.

9. A method of providing a color print of an image having first, second and third color components, comprising in combination the steps of:

providing a magnetic recording medium including alternating first, second and third portions for retaining magnetic records of said first, second and third color components, respectively;

providing at said first portions a magnetic record of said first color component having a maximum first magnetic moment;

providing at said second portions a magnetic record of said second color component having a maximum second magnetic moment lower than said first magnetic moment;

providing at said third portions a magnetic record of said third color component having a maximum third magnetic moment lower than said second magnetic moment;

providing a first toner corresponding in color to said first color component and being magnetically attractable by a magnetic moment of a minimum value between said first and second magnetic moments;

providing a second toner corresponding in color to said second color component and being magnetically attractable by a magnetic moment of a minimum value between said second and third magnetic moments;

providing a third toner corresponding in color to said third color component and being magnetically attractable by a magnetic moment of a minimum value at least as low as said third magnetic moment;

establishing a toner image of said first color component through magnetic attraction of said first toner by the magnetic record of the first color component;

establishing a toner image of said second color component through magnetic attraction of said second toner by the magnetic record of the second color component;

establishing a toner image of said third color component through magnetic attraction of said third toner by the magnetic record of the third color component; and printing out said toner images of said first, second and third color components so as to provide a color print of said image.

10. A method as claimed in claim 9, wherein:

said magnetic record of the first color component is provided by imparting to said first portions a first premagnetization having said first magnetic moment, and by selectively reducing said first magnetic moment in response to the first color component;

said magnetic record of the second color component is provided by imparting to said second portions a second premagnetization having said second magnetic moment, and by selectively reducing said second magnetic moment in response to the second color component; and said magnetic record of the third color component is provided by imparting to said third portions a third premagnetization having said third magnetic moment, and by selectively reducing said third magnetic moment in response to the third color component.

11. A method as claimed in claim 10, wherein:

said first, second and third premagnetizations are imparted to said first, second and third portions, respectively, by providing first magnetic fields having a first predetermined intensity, second magnetic fields having a second predetermined intensity lower than said first intensity, and third magnetic fields having a third predetermined intensity lower than said second intensity, and by magnetizing said first portions with the aid of said first magnetic fields, said second portions with the aid of said second magnetic fields and said third portions with the aid of said third magnetic fields.

12. A method as claimed in claim 10, wherein:

said first, second and third premagnetizations are imparted to said first, second and third portions, respectively, by providing first magnetic fields having a first predetermined intensity, second magnetic fields having a second predetermined intensity lower than said first intensity, and third magnetic fields having a third predetermined intensity lower than said second intensity, exposing said first portions to said first magnetic fields, said second portions to said second magnetic fields and said third portions to said third magnetic fields, and thermoremanently magnetizing said first portions with the aid of said first magnetic fields, said second portions with the aid of said second magnetic fields, and said third portions with the aid of said third magnetic fields.

13. A method as claimed in claim 10, wherein:

said first, second and third premagnetizations are imparted to said first, second and third portions, respetively, by providing magnetic fields, exposing said first, second and third portions to said magnetic fields, magnetizing said first portions with the aid of said magnetic fields and first transfer stimuli, magnetizing said second portions with the aid of said magnetic fields and second transfer stimuli having lower intensities than said first transfer stimuli, and magnetizing said third portions with the aid of said magnetic fields and third transfer stimuli having lower intensities than said second transfer stimuli.

14. A method as claimed in claim 10, wherein:

said first, second and third premagnetizations are imparted to said first, second and third portions, respectively, by providing magnetic fields, exposing said first, second and third portions to said magnetic fields, thermoremanently magnetizing said first portions with the aid of said magnetic fields and first thermal stimuli, thermoremanently magnetizing said second portions with the aid of said magnetic fields and second thermal stimuli having lower intensities than said first thermal stimuli, and thermoremanently magnetizing said third portions with the aid of said magnetic fields and third thermal stimuli having lower intensities than said second thermal stimuli.

15. A method as claimed in claim 9, wherein:

said first portions are provided with magnetic material magnetizable up to a first level of magnetization correlated to said first magnetic moment;

said second portions are provided with magnetic material magnetizable up to a second level of magnetization correlated to said second magnetic moment;

said third portions are provided with magnetic material magnetizable up to a third level of magnetization correlated to said third magnetic moment;

said magnetic record of the first color component is provided by premagnetizing said first portions to said first level, and by selectively reducing the premagnetization of the first portions in response to the first color component;

said magnetic record of the second color component is provided by premagnetizing said second portions to said second level, and by selectively reducing the premagnetization of the second portions in response to the second color component; and said magnetic record of the third color component is provided by premagnetizing said third portions to said third level, and by selectively reducing the premagnetization of the third portions in response to the third color component.

16. A method as claimed in claim 15, wherein:

said first portions are provided with more of said magnetic material than said second portions; and said second portions are provided with more of said magnetic material than said third portions.

17. Apparatus for providing a color print of an image having first and second color components, comprising in combination:

a magnetic recording medium including alternating first and second portions for retaining magnetic records of said first and second color components, respectively;

means operatively associated with said magnetic recording medium for providing at said first portions a magnetic record of said first color component having a maximum first magnetic moment;

means operatively associated with said magnetic recording medium for providing at said second portions a magnetic record of said second color component having a maximum second magnetic moment lower than said first magnetic moment;

means for providing a first toner corresponding in color to said first color component and being magnetically attractable by a magnetic moment of a minimum value between said first and second magnetic moments;

means for providing a second toner corresponding in color to said second color component and being magnetically attractable by a magnetic moment of a minimum value at least as low as said second magnetic moment;

means operatively associated with said supply of first toner for establishing a toner image of said first color component through magnetic attraction of said first toner by the magnetic record of the first color component;

means operatively associated with said supply of second toner for establishing a toner image of said second color component through magnetic attraction of said second toner by the magnetic record of the second color component; and means operatively associated with said toner images for printing out said toner images of said first and second color components to provide a color print of said image.

18. Apparatus as claimed in claim 17, wherein:

said means for providing a magnetic record of said first color component include means for imparting to said first portions a first premagnetization having said first magnetic moment, and for selectively reducing said first magnetic moment in response to the first color component; and said means for providing a magnetic record of said second color component include means for imparting to said second portions a second premagnetization having said second magnetic moment, and for selectively reducing said second magnetic moment in response to the second color component.

19. Apparatus for providing a color print of an image having first and second color components, comprising in combination:

a magnetic recording medium including alternating first and second portions for retaining magnetic records of said first and second color components, respectively, with said first portions including magnetic material magnetizable up to a first level of magnetization and said second portions including magnetic material magnetizable up to a second level of magnetization lower than said first level of magnetization;

means operatively associated with said magnetic recording medium for providing at said first portions a magnetic record of said first color component having a maximum first magnetic moment correlated to said first level of magnetization;

means operatively associated with said magnetic recording medium for providing at said second portions a magnetic record of said second color component having a maximum second magnetic moment correlated to said second level of magnetization and being lower than said first magnetic moment;

means for providing a supply of a first toner corresponding in color to said first color component and being magnetically attractable by a magnetic moment of a maximum value between said first and second magnetic moments;

means for providing a supply of a second toner corresponding in color to said second color component and being magnetically attractable by a magnetic moment of a minimum value at least as low as said second magnetic moment;

means operatively associated with said supply of first toner for establishing a toner image of said first color component through magnetic attraction of said first toner by the magnetic record of the first color component;

means operatively associated with said supply of second toner for establishing a toner image of said second color component through magnetic attraction of said second toner by the magnetic record of the second color component; and means operatively associated with said toner images for printing out said toner images of said first and second color components so as to provide a color print of said image.

20. Apparatus as claimed in claim 19, wherein:

said means for providing a magnetic record of said first color component include means for imparting to said first portions a first premagnetization having said first magnetic moment, and for selectively reducing said first magnetic moment in response to the first color component; and said means for providing a magnetic record of said second color component include means for imparting to said second portions a second premagnetization having said second magnetic moment, and for selectively reducing said second magnetic moment in response to the second color component.

21. Apparatus for providing a color print of an image having first, second and third components, comprising in combination:

a magnetic recording medium including alternating first, second and third portions for retaining magnetic records of said first, second and third color components, respectively;

means operatively associated with said magnetic recording medium for providing at said first portions of magnetic record of said first color component having a maximum first magnetic moment;

means operatively associated with said magnetic recording medium for providing at said second portions a magnetic record of said second color component having a maximum second magnetic moment lower than said first magnetic moment;

means operatively associated with said magnetic recording medium for providing at said third portions a magnetic record of said second color component having a maximum third magnetic moment lower than said second magnetic moment;

means for providing a supply of a first toner corresponding in color to said first color component and being magnetically attractable by a magnetic moment of a minimum value between said first and second magnetic moments;

means for providing a supply of a second toner corresponding in color to said color component and being magnetically attractable by a magnetic moment of a minimum value between said second and third magnetic moments;

means for providing a supply of a third toner corresponding in color to said third color component and being magnetically attractable by a magnetic moment of a minimum value at least as low as said third magnetic moment;

means operatively associated with said supply of first toner for establishing a toner image of said first color component through magnetic attraction of said first toner by the magnetic record of the first color component;

means operatively associated with said supply of second toner for establishing a toner image of said second color component through magnetic attraction of said second toner by the magnetic record of the second color component;

means operatively associated with said supply of third toner for establishing a toner image of said third color component through magnetic attraction of said third toner by the magnetic record of the third color component; and means operatively associated with said toner images of said first, second and third color components for printing out said toner images of said first, second and third color components to provide a color print of said image.

22. Apparatus as claimed in claim 21, wherein:

said means for providing a magnetic record of said first color component include means for imparting to said first portions a first premagnetization having said first magnetic moment, and for selectively reducing said first magnetic moment in response to the first color component;

said means for providing a magnetic record of said second color component include means for imparting to said second portions a second premagnetization having said second magnetic moment, and for selectively reducing said second magnetic moment in response to the second color component; and said means for providing a magnetic record of said third color component include means for imparting to said third portions a third premagnetization having said third magnetic moment, and for selectively reducing said third magnetic moment in response to the third color component.

23. Apparatus for providing a color print of an image having first, second and third color components, comprising in combination:

a magnetic recording medium including alternating first, second and third portions for retaining magnetic records of said first, second and third color components, respectively, with said first portion being provided with magnetic material magnetizable up to a first level of magnetization, said second portions being provided with magnetic material magnetizable up to a second level of magnetization lower than said first level, and said third portions being provided with magnetic material magnetizable up to a third level of magnetization lower than said second level;

means operatively associated with said magnetic recording medium for providing at said first portions a magnetic record of said first color component having a maximum first magnetic moment correlated to said first level of magnetization;

means operatively associated with said magnetic recording medium for providing at said second portions a magnetic record of said second color component having a maximum second magnetic moment correlated to said second level of magnetization and being lower then said first magnetic moment;

means operatively associated with said magnetic recording medium for providing at said third portions a magnetic record of said third color component having a maximum third magnetic moment correlated to said third level of magnetization and being lower than said second magnetic moment;

means providing a supply of a first toner corresponding in color to said first color component and being magnetically attractable by a magnetic moment of a minimum value between said first and second magnetic moments;

means for providing a supply of a second toner corresponding in color to said second color component and being magnetically attractable by a magnetic moment of a minimum value between said second and third magnetic moments;

means for providing a supply of a third toner corresponding in color to said third color component and being magnetically attractable by a magnetic moment of a minimum value at least as low as said third magnetic moment;

means operatively associated with said supply of first toner for establishing a toner image of said first color component through magnetic attraction of said first toner by the magnetic record of the first color component;

means operatively associated with said supply of second toner for establishing a toner image of said second color component through magnetic attraction of said second toner by the magnetic record of the second color component;

means operatively associated with said supply of third toner for establishing a toner image of said third color component through magnetic attraction of said third toner by the magnetic record of the third color component; and means operatively associated with said toner images of said first, second and third color components for printing out said toner images of said first, second and third color components to provide a color print of said image.

24. Apparatus as claimed in claim 23, wherein:

said means for providing a magnetic record of the first color component include means for imparting to said first portions a first premagnetization having said first magnetic moment, and by selectively reducing said first magnetic moment in response to the first color component;

said means for providing a magnetic record of the second color component include means for imparting to said second portions a second premagnetization having second magnetic moment, and for selectively reducing said second magnetic moment in response to the second color component; and said means for providing a magnetic record of the third color component include means for imparting to said third portions a third premagnetization having said third magnetic moment, and for selectively reducing said third magnetic moment in response to the third color component.

25. A composite magnetic recording medium for recording first and second color components of an image, comprising in combination:

an optical filter structure including alternating first and second portions for passing, respectively, said first and second color components;

photoconductive means operatively associated with said filter structure for producing thermal images of said first and second color components; and a layer of magnetic material operatively associated with said photoconductive means and selectively undergoing a change in magnetic states in response to said thermal images, said layer of magnetic material including alternating first and second portions corresponding, respectively, to said first and second portions of said optical filter structure, with said first portions of said layer of magnetic material being magnetizable to a first level of magnetization, and said second portions of said layer of magnetic material being magnetizable to a second level of magnetization different from said first level.

26. A composite magnetic recording medium for recording first, second and third color components of an image, comprising in combination:

an optical filter structure including alternating first, second and third portions for passing, respectively, said first, second and third color components;

photoconductive means operatively associated with said filter structure for producing thermal images of said first, second and third color components; and a layer of magnetic material operatively associated with said photoconductive means and selectively undergoing a change in magnetic states in response to said thermal images, said layer of magnetic material includes recurring first, second and third portions corresponding, respectively, to said first, second and third portions of said optical filter structure, with said first portions of said layer of magnetic material being magnetizable to a first level of magnetization, said second portions of said layer of magnetic material being magnetizable to a second level of magnetization different from said first level, and said third portions of said layer of magnetic material being magnetizable to a third level of magnetization different from said first and second levels.

27. A method of providing a magnetic record of an image having first and second color components, comprising in combination the steps of:

providing a magnetic recording medium including alternating first and second portions for retaining magnetic records of said first and second color components, respectively;

providing at said first portions a magnetic record of said first color component having a maximum first magnetic moment;

providing at said second portions a magnetic record of said second color component having a maximum second magnetic moment lower than said first magnetic moment;

said magnetic record of the first color component being provided by imparting to said first portions a first premagnetization having said first magnetic moment, and by selectively reducing said first magnetic moment in response to the first color component; and said magnetic record of the second color component being provided by imparting to said second portions a second premagnetization having said second magnetic moment, and by selectively reducing said second magnetic moment in response to the second color component.

28. A method of providing a magnetic record of an image having first and second color components, comprising in combination the steps of:

providing a magnetic recording medium including alternating first and second portions for retaining magnetic records of said first and second color components, respectively;

providing at said first portions a magnetic record of said first color component having a maximum first magnetic moment;

providing at said second portions a magnetic record of said second color component having a maximum second magnetic moment lower than said first magnetic moment;

said first portions being provided with magnetic material magnetizable up to a first level of magnetization correlated to said first magnetic moment;

said second portions being provided with magnetic material magnetizable up to a second level of magnetization correlated to said second magnetic moment;

said magnetic record of the first color component being provided by premagnetizing said first portions to said first level, and by selectively reducing the premagnetization of the first portions in response to the first color component; and said magnetic record of the second color component being provided by premagnetizing said second portions to said second level, and by selectively reducing the premagnetization of the second portions in response to the second color component.

29. A method of providing a magnetic record of an image having first, second and third color components, comprising in combination the steps of:

providing a magnetic recording medium including alternating first, second and third portions for retaining magnetic records of said first, second and third color components, respectively;

providing at said first portions a magnetic record of said first color component having a maximum first magnetic moment;

providing at said second portions a magnetic record of said second color component having a maximum second magnetic moment lower than said first magnetic moment;

providing at said third portions a magnetic record of said third color component having a maximum third magnetic moment lower than said second magnetic moment;

said magnetic record of the first color component being provided by imparting to said first portions a first premagnetization having said first magnetic moment, and by selectively reducing said first magnetic moment in response to the first color component;

said magnetic record of the second color component being provided by imparting to said second portions a second premagnetization having said second magnetic moment, and by selectively reducing said second magnetic moment in response to the second color component; and said magnetic record of the third color component being provided by imparting to said third portions a third premagnetization having said third magnetic moment, and by selectively reducing said third magnetic moment in response to the third color component.

30. A method of providing a magnetic record of an image having first, second and third color components, comprising in combination the steps of:

providing a magnetic recording medium including alternating first, second and third portions for retaining magnetic records of said first, second and third color components, respectively;

providing at said first portions a magnetic record of said first color component having a maximum first magnetic moment;

providing at said second portions a magnetic record of said second color component having a maximum second magnetic moment lower than said first magnetic moment;

providing at said third portions a magnetic record of said third color component having a maximum third magnetic moment lower than said second magnetic moment;

said first portions being provided with magnetic material magnetizable up to a first level of magnetization correlated to said first magnetic moment;

said second portions being provided with magnetic material magnetizable up to a second level of magnetization correlated to said second magnetic moment;

said third portions being provided with magnetic material magnetizable up to a third level of magnetization correlated to said third magnetic moment;

31. A magnetic record of an image having first, second and third color components, comprising in combination:

a magnetic recording medium;

a first magnetic record of said first color components, said first magnetic record being on said recording medium and having a maximum first magnetic moment;

a second magnetic record of said second color components, said second magnetic record being on said recording medium and having a maximum second magnetic moment lower than said first magnetic moment; and a third magnetic record of said third color components, said third magnetic record being on said magnetic recording medium and having a maximum third magnetic moment lower than said second magnetic moment.

* * * * *

PO-1050
(5/69)

UNITED STATES PATENT OFFICE
CERTIFICATE OF CORRECTION

Patent No. 3,824,601 Dated July 16, 1974

Inventor(s) Thomas H. Garland et al.

It is certified that error appears in the above-identified patent and that said Letters Patent are hereby corrected as shown below:

In the drawings, sheet 1 of 3, Fig. 2, "32" should read --- 32" ---;

In the drawings, sheet 2 of 3, Fig. 5, the reference numeral ---90--- should be applied to the layer directly under Layer "94";

In the drawings, sheet 2 of 3, Fig. 6, "74" should read ---75---;

Column 1, line 14, "provide" should read ---provided---;

Column 9, line 37, "copies" should read ---copied---;

Column 10, line 16, "protions" should read ---portions---;

Column 11, line 6, "photoconductive" should read ---photoconductor---;

Column 11, line 38, "filer" should read ---filter---;

Column 12, line 10, "element" should read ---elemental---;

Column 14, line 28, "provied" should read ---provided---;

Column 14, line 66, "A" should read ---In---;

Column 15, line 17, after "correct", "," should be deleted;

Column 25, line 63, after "having", ---said--- should be inserted.

PO-1050
(5/69)

UNITED STATES PATENT OFFICE
CERTIFICATE OF CORRECTION

Patent No. 3,824,601 Dated July 16, 1974

Inventor(s) Thomas H. Garland et al.

It is certified that error appears in the above-identified patent and that said Letters Patent are hereby corrected as shown below:

Column 28, line 43 (Claim 30), after "moment;" insert

---said magnetic record of the first color components is provided by premagnetizing said first portions to said first level, and by selectively reducing the premagnetization of the first portions in response to the first color component;

said magnetic record of the second color component is provided by premagnetizing said second portions to said second level, and by selectively reducing the premagnetization of the second portions in response to the second color component; and said magnetic record of the third color component is provided by premagnetizing said third portions to said third level, and by selectively reducing the premagnetization of the third portions in response to the third color component.---

Signed and sealed this 27th day of May 1975.

(SEAL)
Attest:

RUTH C. MASON
Attesting Officer

C. MARSHALL DANN
Commissioner of Patents
and Trademarks